United States Patent [19]

Yamagoshi et al.

[11] 4,032,597

[45] June 28, 1977

[54] THERMOPLASTIC RESIN COMPOSITION

[75] Inventors: Tanoshi Yamagoshi, Niihama; Minoru Terakawa, Saijyo; Aiiti Shirahata, Niihama; Sadao Sekiguchi, Niihama; Saburo Mishiba, Niihama; Takeshi Shimamura, Niihama; Shigeru Tajima, Ashiya, all of Japan

[73] Assignee: Sumitomo Chemical Company, Limited, Osaka, Japan

[22] Filed: Mar. 25, 1975

[21] Appl. No.: 561,986

Related U.S. Application Data

[63] Continuation of Ser. No. 319,233, Dec. 29, 1972, abandoned.

[30] Foreign Application Priority Data

Dec. 29, 1971 Japan .................................. 47-3102

[52] U.S. Cl. ............................... 260/876 R; 260/879
[51] Int. Cl.$^2$ ..................... C08L 9/02; C08L 51/08
[58] Field of Search ......................... 260/876 R, 879

[56] References Cited

UNITED STATES PATENTS 3,475,516  10/1969  Bauer et al. .................. 260/876 R
3,880,951  4/1975  Ooya et al. .................... 260/876 R

*Primary Examiner*—J. Ziegler
*Attorney, Agent, or Firm*—Birch, Stewart, Kolasch and Birch

[57] ABSTRACT

Thermoplastic resin composition having excellent transparency, impact strength, weatherability and gas screening effect comprising a graft copolymer which is produced by polymerizing a vinyl cyanide monomer and an unsaturated carboxylic acid ester monomer in the presence of a gummy copolymer produced by polymerizing a conjugated diolefinic monomer (0 to 90 parts by weight), at least one vinyl cyanide monomer (5 to 60 parts by weight) and at least one unsaturated carboxylic acid ester monomer (5 to 90 parts by weight), in admixture with or without a resin copolymer of a vinyl cyanide monomer and an unsaturated carboxylic acid ester monomer.

14 Claims, No Drawings

THERMOPLASTIC RESIN COMPOSITION

This application is a continuation of copending application Ser. No. 319,233, filed on Dec. 29, 1972, now abandoned. su The present invention relates to a thermoplastic resin composition having excellent transparency, impact strength, weatherability and gas screening effect. Particularly, it relates to a thermoplastic resin composition comprising a copolymer of a conjugated diolefinic monomer, a vinyl cyanide monomer and an unsaturated carboxylic acid ester monomer. More particularly, it relates to a thermoplastic resin composition comprising a graft copolymer which is produced by graft-copolymerizing a vinyl cyanide monomer and an unsaturated carboxylic acid ester monomer in the presence of a gummy copolymer produced by polymerizing a conjugated diolefinic monomer, a vinyl cyanide monomer and an unsaturated carboxylic acid ester monomer, There, hitherto, have been known some thermoplastic resins having somewhat good transparency, impact strength, and gas screening effect, which have been produced by polymerizing an olefinic unsaturated nitrile and an unsaturated carboxylic acid ester in the presence of a copolymer of a conjugated diene monomer and an olefinic unsaturated nitrile in an aqueous solvent (Japanese Patent Publication No. 25005/1971) or by adding a chain transfer agent in the same polymerization system as above (Japanese Patent Opening No. 1340/1971).

Furthermore, as a method for improving the properties of the similar thermoplastic resin composition, it has been known that a copolymer of a conjugated diene monomer and an olefinic unsaturated nitrile is used as a skeleton elastomer and a monomer such as α-olefins, styrene or isobutylene is added in the polymerization step other than that of production of the skeleton elastomer as well as an olefinic unsaturated nitrile and an unsaturated carboxylic acid ester (Belgian Pat. Nos. 739,568, 746,265 and 757,428, German OLS No. 1,949,333 and U.S. Pat. No. 3,580,974).

However, the composition produced by these known methods is somewhat inferior in its properties, especially in the weatherability and gas screening effect and therefore is not necessarily satisfactory for practical use.

Studies have been carried out to find a method for improving the properties of a thermoplastic resin composition, such as transparency, impact strength, weatherability and gas screening effect, and it has now been found that a desirable thermoplastic resin composition having excellent transparency, impact strength, weatherability and gas screening effect can be produced by using as the skeleton polymer a gummy copolymer containing an unsaturated carboxylic acid ester monomer.

An object of the present invention is to provide a thermoplastic resin composition having excellent transparency, impact strength, weatherability and gas screening effect.

Another object of the invention is to provide a thermoplastic resin composition comprising a copolymer of a conjugated diolefinic monomer, a vinyl cyanide monomer and an unsaturated carboxylic acid ester monomer.

Further object of the invention is to provide a method for producing a thermoplastic resin composition having excellent transparency, impact strength, weatherability and gas screening effect.

These and other objects will be apparent from the description hereinafter.

According to the present invention, there can be produced a thermoplastic resin composition having excellent transparency, impact strength, weatherability and gas screening effect comprising a graft copolymer which is produced by polymerization of a vinyl cyanide monomer and an unsaturated carboxylic acid ester monomer in the presence of a gummy copolymer produced by polymerizing a conjugated diolefinic monomer (0 to 90 parts by weight), a vinyl cyanide monomer (5 to 60 parts by weight) and an unsaturated carboxylic acid ester monomer (5 to 90 parts by weight), or a mixture of the graft copolymer and a copolymer of a vinyl cyanide monomer and an unsaturated carboxylic acid ester monomer.

The vinyl cyanide monomers used in the present invention are an olefinic unsaturated nitrile compound of the formula:

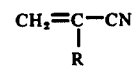

wherein R is hydrogen, an alkyl group having 1 to 4 carbon atoms or halogen atom. The suitable examples may be acrylonitrile, methacrylonitrile, ethacrylonitrile, α-chloroacrylonitrile, α-fluoroacrylonitrile and the like. Among these, acrylonitrile and methacrylonitrile are preferable from the viewpoint of economics and availability.

The unsaturated carboxylic acid ester monomers used in the invention are preferably a compound of the formula:

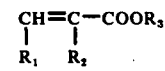

wherein $R_1$ is hydrogen, an alkyl group having 1 to 4 carbon atoms or a group —$COOR_3$, $R_2$ is hydrogen, an alkyl group having 1 to 4 carbon atoms, a group —$CH_2$—$COOR_3$ or a group —$COOR_3$ and $R_3$ is an alkyl group having 1 to 18 carbon atoms, an arocyclic group or an aromatic group. The suitable examples may be methyl acrylate, ethyl acrylate, propyl acrylate, butyl acrylate, amyl acrylate, hexyl acrylate, octyl acrylate, lauryl acrylate, stearyl acrylate, methyl methacrylate, ethyl methacrylate, propyl methacrylate, butyl methacrylate, amyl methacrylate, hexyl methacrylate, octyl methacrylate, lauryl methacrylate, stearyl methacrylate, phenyl acrylate, benzyl acrylate, phenyl methacrylate, benzyl methacrylate, cyclohexyl acrylate, cyclohexyl methacrylate, dimethyl fumarate, diethyl fumarate, dibutyl fumarate, dioctyl fumarate, dilauryl fumarate, dimethyl maleate, diethyl maleate, dibutyl maleate, dioctyl maleate, dilauryl maleate, dimethyl itaconate, diethyl itaconate, dibutyl itaconate, dioctyl itaconate, dilauryl itaconate, methyl crotonate, ethyl crotonate, butyl crotonate, dimethyl methylenemalonate, diethyl methylenemalonate, dibutyl methylenemalonate, and the like. The suitable examples of the unsaturated carboxylic acid ester monomers having a reactive group on the side chain may be glycidyl methacrylate, glycidyl acrylate, t-butyl acrylate, isobutyl acrylate, isopropyl acrylate, t-butyl methacrylate, isobutyl methacrylate, isopropyl methacrylate, and the like. Other examples of the unsaturated carboxylic acid ester monomers may be those having a group other than a hydrocarbon group, such as methyl α-chloroacrylate, ethyl α-chloroacrylate, methyl α-chloromethacrylate, ethyl α-chloromethacrylate, methyl α-fluoroacrylate, methyl α-fluoromethacrylate, methyl α-cyanoacrylate, ethyl α-cyanoacrylate, methyl α-cyanomethacrylate and ethyl α-cyanomethacrylate.

The suitable examples of the conjugated diolefinic monomers used in the invention may be 1,3-butadiene, isoprene, chloroprene, bromoprene, cyanoprene, 2,3-diethyl-1,3-butadiene, and the like. Among these, butadiene and isoprene are especially preferable from the viewpoint of its availability and the excellent copolymerizability thereof.

According to the present invention an unsaturated carboxylic acid ester monomer is used as an essential component of the gummy copolymer which is one component of the present thermoplastic resin composition and thereby the objective thermoplastic resin composition can be given excellent weatherability and gas screening effect.

The unsaturated carboxyic acid ester monomer used for the preparation of the gummy copolymer is employed in a range of 5 to 90 parts by weight, preferably 10 to 60 parts by weight. When the unsaturated carboxylic acid ester monomer is employed in an amount less then 5 parts by weight, the thermoplastic resin composition shows inferior weatherability and gas screening effect. On the other hand, when it is over 90 parts by weight, the product shows inferior transparency and further it becomes costly, and therefore, it is not suitable for practical use. When there is employed an unsaturated carboxylic acid ester monomer which can give a single polymer having a high refractive index, the product shows excellent transparency and primary coloring property even if the unsaturated carboxylic acid ester monomer is employed in a large amount over the upper limit.

The vinyl cyanide monomer used for the preparation of the gummy copolymer is employed in a range of 5 to 60 parts by weight, preferably 15 to 40 parts by weight. When the vinyl cyanide monomer is employed in an amount over 60 parts by weight, the gummy copolymer per se becomes brittle and therefore the produced thermoplastic resin composition shows inferior impact strength and primary coloring property. On the other hand, when it is less than 5 parts by weight the transparency, gas screening effect and ability to withstand chemicals cannot be obtained sufficiently.

The conjugated diolefinic monomer used for the preparation of the gummy copolymer is employed in a range of 0 to 90 parts by weight, preferably 10 to 60 parts by weight. When the conjugated diolefinic monomer is employed in an amount over 90 parts by weight, the thermoplastic resin composition shows inferior weatherability and gas screening effect. When the conjugated diolefinic monomer is not contained therein, the weatherability and gas screening effect are rather increased. Therefore, in the present invention, it is not necessarily required to employ the conjugated diolefinic monomer. However, if the conjugated diolefinic monomer is not contained or is in an amount of less than 10 parts by weight, the degree of cross linking of the gummy copolymer and the degree of the graft-polymerization are decreased. In such case, for giving an appropriate reactivity to the gummy copolymer, there may be used a monomer having high reactivity (e.g. glycidyl methacrylate, glycidyl acrylate, t-butyl acrylate, isobutyl acrylate, isopropyl acrylate, t-butyl methacrylate, isobutyl methacrylate, or isopropyl methacrylate) as the inside chain of the unsaturated carboxylic acid esters.

Furthermore, prior to the graft-polymerization, the gummy copolymer may be previously subjected to peroxidation, chlorination or chlorosulfonation and thereby the reactivity is given to the gummy copolymer. There may be optionally added a chain transfer agent, cross linking agent or the like in the preparation of the gummy copolymer.

As the conjugated diolefinic monomer, vinyl cyanide monomer or unsaturated carboxylic acid ester monomer which is a component of the gummy copolymer, there may be employed two or more kinds of monomers selected from a single monomer group. There may be also employed a small amount of a monomer other than the above three monomers, such as vinyl aromatic monomer, vinyl ketone monomer, vinyl ether monomer or t-butylstyrene.

The polymerization for the present gummy copolymer can be carried out by any conventional method, for instance, the monomers can be added at one time in portions, or continually, and thereby there can be obtained the desired gummy copolymer suitable for the preparation of the present thermoplastic resin composition.

The graft copolymer composing the present composition can be prepared by copolymerizing a vinyl cyanide monomer and an unsaturated carboxylic acid ester monomer in the presence of the above gummy copolymer. The suitable graft copolymer can be preferably prepared by graft-copolymerizing 95 to 20 parts by weight of monomers comprising a vinyl cyanide monomer (90 to 40% by weight) and an unsaturated carboxylic acid ester monomer (10 to 60% by weight) to 5 to 80 parts by weight of the gummy copolymer being the base polymer. When the gummy copolymer is employed in an amount of less than 5 parts by weight, the product shows inferior impact strength, and therefore, it is preferable to employ not less than 5 parts by weight for the preparation of a product having excellent impact strength. On the other hand, when it is employed in an amount over 80 parts by weight, the degree of graf-polymerization is decreased because of a less amount of monomer which composes the branch of the graft copolymer, and therefore the product has inferior compatability with the resin copolymer to be blended and further an inferior impact strength and surface state.

When the vinyl cyanide monomer, which is one of the monomers composing the branch of the graft copolymer, is less than 40% by weight, i.e. when the unsaturated carboxylic acid ester monomer is more than 60% by weight, it causes a decrease of the chemical fastners and gas screening effect of the final thermoplastic resin composition. On the other hand, when the vinyl cyanide monomer is more than 90% by weight, i.e. when the unsaturated carboxylic acid ester monomer is less than 10% by weight, the workability of the final product is decreased.

The present graft copolymer can be used alone or in admixture with a resin copolymer consisting of a vinyl cyanide monomer and an unsaturated carboxylic acid ester monomer.

There is no particular limitation to the ratio of components of the resin copolymer, but preferably, the vinyl cyanide monomer is in a range of 90 to 40 parts by weight and the unsaturated carboxylic acid ester monomer is in a range of 10 to 60 parts by weight. When the vinyl cyanide monomer is over 90 parts by weight, i.e. when the unsaturated carboxylic acid ester monomer is less than 10 parts by weight, the resin copolymer has inferior compatibility with the present graft copolymer, and it tends to decrease the surface-luster, workability and impact strength, and further the use of a large amount of the vinyl cyanide monomer causes the inhibition of the primary coloring property and the transparency. On the other hand, when the vinyl cyanide monomer is less than 40 parts by weight, i.e. when the unsaturated carboxylic acid ester monomer is over 60 parts by weight, the chemical fastness is decreased.

In the present thermoplastic resin composition, the gummy copolymer should be included in a range of 3 to 50% by weight, preferably 5 to 35% by weight on the basis of the whole weight of the composition, and the vinyl cyanide monomer should be included in a range of 50 to 95% by weight, preferably 60 to 85% by weight and the unsaturated carboxylic acid ester monomer be included in a range of 50 to 5% by weight, preferably 40 to 15% by weight on the basis of the weight (100% by weight) of those components excluding the gummy copolymer. When the gummy copolymer is included in an amount less than 3% by weight in the final composition, the impact strength is not sufficiently given to the product. On the other hand, when it is more than 40% by weight, the hardness, tensile strength, rigidity, heat resistance and gas screening effect are decreased. But even in such case the gas screening effect is improved in comparison with the product prepared by using a conventional gummy copolymer as shown in the example hereinafter. When the vinyl cyanide monomer is less than 50% by weight, i.e. when the unsaturated carboxylic acid ester monomer is more than 50 % by weight on the basis of the weight of those excluding the gummy copolymer in the final composition, the chemical fastness solvent resistance and heat resistance are decreased. On the other hand, when the vinyl cyanide monomer is over 95% by weight, i.e. when the unsaturated carboxylic acid ester monomer is less than 5% by weight, the workability, primary coloring property and transparency are decreased.

The vinyl cyanide monomer and the unsaturated carboxylic acid ester monomer to be added to the graft-polymerization system are not necessarily added simultaneously as the mixture thereof, but may be added separately at different times (i.e. after adding one monomer, the other is added). There is no particular limitation to the method for the addition of emulsifier, catalyst or the like, and they may be added at one time, intermittently or continually. There may be also used a chain transfer agent for controlling the workability and the degree of graft-polymerization.

When the gummy copolymer includes a particularly smaller amount of the conjugated diolefinic monomer, i.e. the unsaturated carboxylic acid ester monomer is included in large amount, it is preferable to treat the gummy copolymer with a peroxide, which may be used together with a reducing agent, prior to the graft-polymerization to give reactivity to the copolymer, as described hereinbefore.

The present graft polymer can be preferably prepared by emulsion-polymerization, but also by any other conventional polymerization methods, such as bulk-polymerization, solution-polymerization and suspension-polymerization. The graft-polymerization can be preferably carried out in an atmosphere of an inert gas in the presence of a redical catalyst at a temperature of 0° to 100° C.

The thermoplastic resin composition of the present invention can be molded by conventional molding methods, such as injection molding, milling molding, rolling molding and blow molding. The present thermoplastic resin composition has excellent solvent resistance, impact strength, weatherability and gas screening effect and therefore is useful as a packaging material and further for making bottles, films and the like.

The present invention is illustrated by the following examples but is not limited thereto. In the Examples parts are by weight.

EXAMPLE 1

A. Preparation of gummy copolymers

Gummy copolymers $x$ to $f$ were prepared by polymerization with continuous agitation at 5° C (inside temperature of the polymerization vessel) for about 80 hours in the substantial absence of oxygen in accordance with the formulation shown in Table I. The gummy copolymers were obtained as a gummy copolymer latex having about 50% of solid materials in the yield of about 80%.

Gummy copolymers $y$ to $h$ were prepared by polymerization at 40° C (inside temperature of the polymerization vessel) for 20 hours in the substantial absence of oxygen. The gummy copolymer were obtained as a gummy copolymers latex having about 50% of solid materials in the yield of about 97 or more %.

Table I

| Component (part) | x (Comp. Ex.) | a | b | c | d | e | f | y (Comp. Ex.) | g | h |
|---|---|---|---|---|---|---|---|---|---|---|
| Butyl acrylate | — | 25 | 40 | 60 | 40 | 10 | 70 | — | — | — |
| Dioctyl maleate | — | — | — | — | — | — | — | — | 25 | — |
| Ethyl acrylate | — | — | — | — | — | — | — | — | — | 25 |
| Butadiene | 60 | 35 | 20 | 20 | 30 | 50 | — | 60 | 35 | 35 |
| Acrylonitrile | 40 | 40 | 40 | 20 | 30 | 40 | 30 | 40 | 40 | 40 |
| t-Dodecylmercaptan | 0.75 | 0.75 | 0.75 | 0.75 | 0.75 | 0.75 | 0.75 | 0.5 | 0.5 | 0.5 |
| Diisobutyl hydroperoxide | 0.10 | 0.10 | 0.10 | 0.10 | 0.10 | 0.10 | 0.10 | — | — | — |
| CLEWAT 100S*1 | 0.01 | 0.01 | 0.01 | 0.01 | 0.01 | 0.01 | 0.01 | — | — | — |
| Rongalit | 0.08 | 0.08 | 0.08 | 0.08 | 0.08 | 0.08 | 0.08 | — | — | — |
| Ferrous sulfate | 0.01 | 0.01 | 0.01 | 0.01 | 0.01 | 0.01 | 0.01 | — | — | — |
| NILOX TG*2 | 2.0 | 2.0 | 2.0 | 2.0 | 2.0 | 2.0 | — | — | — | — |
| DEMOL N*3 | 1.0 | 1.0 | 1.0 | 1.0 | 1.0 | 1.0 | 2.0 | — | — | — |
| ALSCOPE*4 | 1.3 | 1.3 | 1.3 | 1.3 | 1.3 | 1.3 | 1.3 | — | — | — |

Table I-continued

| Component (part) | Gummy copolymer | | | | | | | | | |
|---|---|---|---|---|---|---|---|---|---|---|
| | x (Comp. Ex.) | a | b | c | d | e | f | y (Comp. Ex.) | g | h |
| Potassium sulfate | 1.0 | 1.0 | 1.0 | 1.0 | 1.0 | 1.0 | 1.0 | — | — | — |
| Potassium hydroxide | 0.3 | 0.3 | 0.3 | 0.3 | 0.3 | 0.3 | 0.3 | — | — | — |
| OS soap[*5] | — | — | — | — | — | — | — | 2.0 | 2.0 | 2.0 |
| Sodium carbonate | — | — | — | — | — | — | — | 1.0 | 1.0 | 1.0 |
| Potassium persulfate | — | — | — | — | — | — | — | 1.0 | 1.0 | 1.0 |
| Water | 60 | 60 | 60 | 60 | 60 | 60 | 200 | 100 | 100 | 100 |

[*1]An emulsifier (ethylenediamine tetraacetic acid.4 Na salt), made by Teikoku Kagaku Sangyo
[*2]An emulsifier (a mixture of potassium rhodinate and potassium oleate), made by Heyden Newport Chemical Corp.
[*3]An emulsifier (sodium oleosulfate), made by Kao Atlas Co.
[*4]An emulsifier (oleic acid), made by Toho Kagaku Co.
[*5]An emulsifier (sodium stearate), made by Kao Soap Co.

B. Preparation of graft copolymer

In accordance with the formulation shown in Table II, the graft-copolymerization was carried out in the substantial absence of oxygen. The graft copolymers X to H were prepared by polymerization at 65° C (inside temperature of the polymerization vessel) for 7 hours in the yield of 95 to more %.

Graft copolymer F was prepared as follows: To the gummy copolymer f were added DIBHP (diisobutyl hydroperoxide, 0.5 part), dextrin (1.0 part), TSPP (tetrasodium perphosphate, 0.5 part) and ferrous sulfate (0.01 part) and the mixture was heated at 80° C for 2 hours and then subjected to the graft-copolymerization as shown in Table II.

Each graft copolymer latex thus obtained was salted out with aluminum sulfate, separated by filtration and washed with water. The obtained wet cake of the graft copolymer was dried at 80° C for 24 hours to give a powdery graft copolymer. The powdery graft copolymer thus obtained was milled by a roll mill, pulverized by a pulverizer and then pressed under heating to give test pieces. The test results are shown in Table II.

As made clear from the test results, graft copolymer A to F being the present thermoplastic resin composition show superior impact strength, $CO_2$ permeability (gas screening effect) and impact strength after decreasing of weatherability in comparison with the Comparative Example X. The present graft copolymers G and H also show superior impact strength, gas screening effect and impact strength after decreasing of weatherability in comparison with the Comparative Example Y.

Table II

| Graft copolymer | X (Comp. Ex.) | A | B | C | D | E | F | Y (Comp. Ex.) | G | H |
|---|---|---|---|---|---|---|---|---|---|---|
| Component: (part) | | | | | | | | | | |
| Gummy copolymer | x | a | b | c | d | e | f | y | g | h |
| Amount thereof[*1] | 10 | 10 | 10 | 10 | 10 | 10 | 10 | 35 | 35 | 35 |
| Methyl acrylate | 25 | 25 | 25 | 25 | 25 | 25 | 25 | — | — | — |
| Ethyl acrylate | — | — | — | — | — | — | — | 15 | 15 | 15 |
| Acrylonitrile | 65 | 65 | 65 | 65 | 65 | 65 | 65 | 50 | 50 | 50 |
| n-Dodecyl-mercaptan | 1.0 | 1.0 | 1.0 | 1.0 | 1.0 | 1.0 | 1.0 | 1.0 | 1.0 | 1.0 |
| t-Dodecyl-mercaptan | 1.0 | 1.0 | 1.0 | 1.0 | 1.0 | 1.0 | 1.0 | — | — | — |
| Potassium persulfate | 0.1 | 0.1 | 0.1 | 0.1 | 0.1 | 0.1 | 0.1 | 0.4 | 0.4 | 0.4 |
| CLEWAT 100S | 0.05 | 0.05 | 0.05 | 0.05 | 0.05 | 0.05 | 0.05 | 0.05 | 0.4 | 0.4 |
| PLYSURF A-217E[*2] | 3.0 | 3.0 | 3.0 | 3.0 | 3.0 | 3.0 | 3.0 | 3.0 | 3.0 | 3.0 |
| Water | 200 | 200 | 200 | 200 | 200 | 200 | 200 | 200 | 200 | 200 |
| Properties of the graft copolymer: | | | | | | | | | | |
| Charpy impact[*3] value (with notch) (kg.cm/cm$^2$) | 11 | 13 | 17 | 16 | 15 | 13 | 12 | 65 | 79 | 66 |
| Ray transmission rate[*4] (%) | — | — | — | — | — | — | — | 80 | 77 | 81 |
| $CO_2$ permeability[*5] (cc.cm/cm$^2$.sec. cm.Hg) | $\times 10^{-12}$ 0.5 | $\times 10^{-12}$ 0.27 | $\times 10^{-12}$ 0.20 | $\times 10^{-12}$ 0.12 | $\times 10^{-12}$ 0.14 | $\times 10^{-12}$ 0.27 | $\times 10^{-12}$ 0.10 | $\times 10^{-12}$ 25 | $\times 10^{-12}$ 5.2 | $\times 10^{-12}$ 3.5 |
| Charpy impact[*6] value (without notch) (kg.cm/cm$^2$) | 8 | 10 | 24 | 24 | 23 | 10 | 20 | 100 | 140 | 123 |

[*1]It was shown by part which was calculated in its solid materials.
[*2]An emulsifier (phosphoric acid ester of polyoxyethylene alkyl allyl ether), made by Daiichi Kogyo Seiyaku
[*3]ASTM D-256
[*4]2mm pressed plate was used. Ray transmission rate at a wave length of 640 mμ
[*5]By an apparatus for measurement of gas permeability, made by Shibayama Kagaku Co.
[*6]After irradiating with weather-ometer made by Toyo Rika Co. for 200 hours

EXAMPLE 2

In accordance with the formulation shown in Table III, the graft-copolymerization was carried out by using the gummy copolymer latex obtained in Example 1 A. The conditions of graft-copolymerization, salting drying and for making the test pieces were the same as described in Example 1. The test results are shown in Table III.

As made clear from the test results, the present composition (A-1) shows superior impact strength, gas screening effect and impact strength after decreasing of weatherability in comparison with the Comparative Example (X-1).

Table III

| Graft copolymer | (Comp. Ex.) X - 1 | A - 1 |
|---|---|---|
| Component: (part) | | |
| Gummy copolymer latex | x | a |
| Amount thereof (calculated in its solid materials) | 30 | 30 |
| Methyl acrylate | 17.5 | 17.5 |
| Acrylonitrile | 52.5 | 52.5 |
| n-Dodecylmercaptan | 1.0 | 1.0 |
| t-Dodecylmercaptan | 1.0 | 1.0 |
| Potassium persulfate | 0.4 | 0.4 |
| CLEWAT 100S | 0.05 | 0.05 |
| PLYSURF A-217E | 3.0 | 3.0 |
| Water | 200 | 200 |
| Properties of the graft copolymer: | | |
| Charpy impact value (with notch) (kg.cm/cm$^2$) | 93 | 111 |
| Ray transmission rate (%) | 79.5 | 80.0 |
| CO$_2$ permeability (cc.cm/cm$^2$.sec.cm.Hg) | $18.3 \times 10^{-12}$ | $1.6 \times 10^{-12}$ |
| Charpy impact value (without notch, after irradiating with weather-ometer for 300 hours) (Kg.cm/cm$^2$) | 140 | 190 |

EXAMPLE 3

In accordance with the formulation shown in Table IV, a resin copolymer and graft copolymer were prepared individually. The polymerization for the resin copolymer and graft copolymer were carried out each at 65° C (inside temperature of the polymerization vessel) for 7 hours in the yield of 95 or more %.

The resin copolymer and graft copolymer thus obtained were latex-blended and the final product was obtained in the same manner as described in Example 1. The properties of the product are shown in Table V.

Table IV

| Component (part) | Graft copolymer A-2 | Graft copolymer X-2 | Resin copolymer R-1 |
|---|---|---|---|
| Gummy copolymer latex | a | x | — |
| Amount of the latex (part, calculated in its solid materials) | 50 | 50 | — |
| Methyl methacrylate | 15 | 15 | 30 |
| Acrylonitrile | 35 | 35 | 70 |
| n-Dodecylmercaptan | 1.0 | 1.0 | 1.0 |
| Potassium persulfate | 0.7 | 0.7 | 0.1 |
| CLEWAT 100S | 0.05 | 0.05 | 0.05 |
| PLYSURF A-217E | 3.0 | 3.0 | 3.0 |
| Water | 200 | 200 | 200 |

Table V

| Component: (part) | A-2 | (Comp. Ex.) X-2 | A-2 | (Comp. Ex.) X-2 |
|---|---|---|---|---|
| Graft copolymer | | | | |
| Amount thereof (calculated in its solid materials) | 16 | 16 | 30 | 30 |
| Resin copolymer | R-1 | R-1 | R-1 | R-2 |
| Amount thereof (calculated in its solid materials) | 84 | 84 | 70 | 70 |
| Properties of the product: | | | | |
| Charpy impact value (with notch) (kg.cm/cm$^2$) | 12 | 10 | 80 | 75 |
| CO$_2$ permeability (cc.cm/cm$^2$.sec.cm.Hg) | $0.20 \times 10^{-12}$ | $0.28 \times 10^{-12}$ | $0.70 \times 10^{-12}$ | $2.0 \times 10^{-12}$ |
| Charpy impact value (without notch, after irradiating with weather-ometer for 200 hours) (kg.cm/cm$^2$) | 8 | 7 | 54 | 46 |

EXAMPLE 4

A resin copolymer was prepared by solution-polymerization. In accordance with the formulation shown in Table VI, the resin copolymer was prepared by polymerization at 45° C (inside temperature of the polymerization vessel) for 6 hours in the substantial absence of oxygen in the yield of 95 or more %. The reaction mixture was mixed with a large amount of water and the precipitated copolymer was washed with water and dried to give a white powdery copolymer. The obtained powdery resin copolymers R-2 and R-3 were roll-blended wth the graft copolymer A-2 obtained in Example 3 to give a thermoplastic resin composition. The properties of the product are shown in Table VII.

Table VI

| Component (part) | Resin copolymer R-2 | Resin copolymer R-3 |
|---|---|---|
| Methyl methacrylate | 10 | 30 |
| Acrylonitrile | 90 | 70 |
| Hydrogen peroxide | 0.12 | 0.12 |
| Ferrous sulfate | 0.05 | 0.05 |
| Zinc chloride | 500 | 500 |
| Water | 420 | 420 |

Table VII

| Component: (part) | | |
|---|---|---|
| Graft copolymer | A-2 | A-2 |
| Amount thereof | 16 | 16 |
| Resin copolymer | R-2 | R-3 |
| Amount thereof | 84 | 84 |
| Properties of the products: | | |
| Charpy impact value (with notch) | | |

Table VII-continued

| (kg.cm/cm²) | 23.8 | 6.4 |
|---|---|---|
| $CO_2$ permeability (cc.cm/cm².sec.cm.Hg) | $0.15 \times 10^{-12}$ | $0.23 \times 10^{-12}$ |
| Charpy impact value (without notch, after irradiating with weather-ometer for 200 hours) (kg cm/cm²) | 11.0 | 8.0 |

EXAMPLE 5

In accordance with the formulation shown in Table VIII, the graft-copolymerization was carried out at 65° C (inside temperature of the polymerization vessel) for 7 hours by using the gummy copolymer (b) obtained in Example 1 (A). The yield in each case was 95 or more %. The conditions of the salting and for making test pieces were the same as described in Example 1. The results are shown in Table VIII.

Table VIII

| Graft copolymer | B-1 | B-2 | B-3 | B-4 |
|---|---|---|---|---|
| Component: (part) | | | | |
| Amount of gummy copolymer (b) (calculated in its solid materials) | 15.0 | 15.0 | 15.0 | 15.0 |
| Dibutyl maleate | — | 15 | — | — |
| Dioctyl fumarate | — | — | 5 | — |
| Hydroxyethyl acrylate | — | — | — | 5 |
| Ethyl acrylate | 25.5 | 14 | 24 | 2.4 |
| Acrylonitrile | 59.5 | 56 | 56 | 56 |
| n-Dodecylmercaptan | 1.0 | 1.0 | 1.0 | 1.0 |
| Potassium persulfate | 0.2 | 0.2 | 0.2 | 0.2 |
| CLEWAT 100S | 0.05 | 0.05 | 0.05 | 0.05 |
| PLYSURF A-217E | 3.0 | 3.0 | 3.0 | 3.0 |
| Water | 200 | 200 | 200 | 200 |
| Properties of the product: | | | | |
| Charpy impact value (with notch) (kg.cm/cm²) | 75 | 90 | 102 | 70 |
| Ray transmission rate (%) | 80 | 75 | 74 | 79 |

EXAMPLE 6

In accordance with the formulation shown in Table IX, a resin copolymer and graft copolymer were prepared individually by copolymerization at 65° C (inside temperature of the polymerization vessel) for 7hours in the yield of 95%. The resin copolymer and graft copolymer were latex-blended as shown in Table X and then the final product was prepared in the same manner as described in Example 1.

Table IX

| | Graft copolymer | | Resin copolymer |
|---|---|---|---|
| Component (part) | A-3 | X-3 | R-4 |
| Gummy copolymer latex | a | x | — |
| Amount thereof (calculated in its solid materials) | 70 | 70 | — |
| Methyl acrylate | 10 | 10 | 30 |
| Acrylonitrile | 20 | 20 | 70 |
| n-Dodecylmercaptan | 1.0 | 1.0 | 1.0 |
| Potassium persulfate | 0.9 | 0.9 | 0.1 |
| CLEWAT 100S | 0.05 | 0.05 | 0.05 |
| PLYSURF A-217E | 3.0 | 3.0 | 3.0 |
| Water | 400 | 400 | 200 |

Table X

| Component: (part) | | (Comp. Ex.) |
|---|---|---|
| Graft copolymer | A-3 | X-3 |
| Amount thereof (calculated in its solid materials) | 15 | 15 |
| Resin copolymer | R-4 | R-4 |
| Amount thereof (calculated in its solid materials) | 85 | 85 |
| Properties of the product: | | |
| Charpy impact value (with notch) (kg.cm/cm²) | 13 | 12 |
| $CO_2$ permeability (cc.cm/cm².sec.cm.Hg) | $0.28 \times 10^{-12}$ | $0.32 \times 10^{-12}$ |
| Charpy impact value (without notch, after irradiating with weather-ometer for 200 hours) (kg.cm/cm²) | 10 | 9 |

What is claimed is:

1. A thermoplastic resin composition having excellent transparency, impact strength, weatherability and gas screening effects comprising (1) a graft copolymer which is produced by polymerizing a vinyl cyanide monomer and an unsaturated carboxylic acid ester monomer in the presence of a gummy copolymer produced by polymerizing 10 to 60 parts by weight of a conjugated diolefinic monomer, 5 to 60 parts by weight of at least one vinyl cyanide monomer and 5 to 90 parts by weight of at least one unsaturated carboxylic acid ester monomer in admixture with (2) a resinous copolymer of a vinyl cyanide monomer and an unsaturated carboxylic acid ester monomer.

2. The thermoplastic resin composition according to claim 1, wherein the composition comprises 3 to 50% by weight of the gummy copolymer on the basis of the whole composition.

3. The thermoplastic resin composition according to claim 1, wherein the vinyl cyanide monomer is an olefinic unsaturated nitrile compound of the formula:

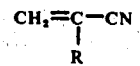

wherein R is hydrogen, an alkyl group having 1 to 4 carbon atoms or a halogen atom.

4. The thermoplastic resin composition according to claim 1, wherein the unsaturated carboxylic acid ester monomer is a compound of the formula:

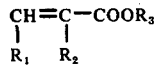

wherein $R_1$ is hydrogen, an alkyl group having 1 to 4 carbon atoms or the group $-COOR_3$, $R_2$ is hydrogen, an alkyl group having 1 to 4 carbon atoms, the group $-CH_2-COOR_3$ or the group $-COOR_3$ and $R_3$ is an alkyl group having 1 to 18 carbon atoms, an aromatic group or an alicyclic group.

5. The thermoplastic resin composition according to claim 1, wherein the conjugated diolefinic monomer is a member selected from the group consisting of 1,3-butadiene, isoprene, chloroprene, bromoprene, cyanoprene and 2,3-diethyl-1,3-butadiene.

6. The thermoplastic resin composition according to claim 1, wherein the resinous copolymer comprises 90 to 40 parts by weight of the vinyl cyanide monomer and 10 to 60 parts by weight of the unsaturated carboxylic acid ester monomer.

7. The thermoplastic resin composition according to claim 1, wherein the graft copolymer is produced by polymerizing 95 to 20 parts by weight of a mixture of monomers comprising 90 to 40% by weight of the vinyl cyanide monomer and 10 to 60% by weight of the unsaturated carboxylic acid ester monomer in the presence of 5 to 80 parts by weight of the gummy copolymer.

8. The thermoplastic resin composition according to claim 7, wherein the composition comprises 3 to 50% by weight of the gummy copolymer on the basis of the whole composition.

9. The thermoplastic resin composition according to claim 8, wherein the resinous copolymer comprises 90 to 40 parts by weight of the vinyl cyanide monomer and 10 to 60 parts by weight of the unsaturated carboxylic acid ester monomer.

10. The thermoplastic resin composition according to claim 9, wherein the gummy copolymer is produced by polymerizing 10 to 60 parts by weight of a conjugated diolefinic monomer, 15 to 40 parts by weight of at least one vinyl cyanide monomer and 10 to 60 parts by weight of at least one unsaturated carboxylic acid ester monomer.

11. A method for producing a thermoplastic resin composition having excellent transparency, impact strength, weatherability and gas screening effects which comprises graft-copolymerizing a vinyl cyanide monomer and an unsaturated carboxylic acid ester monomer in the presence of a gummy copolymer produced by polymerizing 10 to 60 parts by weight of a conjugated diolefinic monomer, 5 to 60 parts by weight of at least one vinyl cyanide monomer and 5 to 90 parts by weight of at least one unsaturated carboxylic acid ester monomer, and blending the graft copolymer with a resinous copolymer of a vinyl cyanide monomer and an unsaturated carboxylic acid ester monomer.

12. The method according to claim 11, wherein the graft-copolymerization is carried out by using 95 to 20 parts by weight of a mixture of monomers comprising 90 to 40% by weight of the vinyl cyanide monomer and 10 to 60% by weight of the unsaturated carboxylic acid ester monomer and 5 to 80 parts by weight of the gummy copolymer.

13. The method according to claim 12, wherein the resinous copolymer comprises 90 to 40 parts by weight of the vinyl cyanide monomer and 10 to 60 parts by weight of the unsaturated carboxylic acid ester monomer.

14. The method according to claim 13, wherein the composition comprises 3 to 50% by weight of the gummy copolymer on the basis of the whole composition.

* * * * *